(12) United States Patent
Matsufuji et al.

(10) Patent No.: US 6,480,250 B1
(45) Date of Patent: Nov. 12, 2002

(54) LOW-REFLECTION TRANSPARENT CONDUCTIVE MULTI LAYER FILM HAVING AT LEAST ONE TRANSPARENT PROTECTIVE LAYER HAVING ANTI-SMUDGE PROPERTIES

(75) Inventors: Akihiro Matsufuji, Kanagawa (JP); Kenichiro Hatayama, Kanagawa (JP); Takahiro Moto, Kanagawa (JP); Yasuo Mukunoki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/587,256

(22) Filed: Jun. 2, 2000

(30) Foreign Application Priority Data

Jun. 2, 1999 (JP) .............................................. 11-155462
Aug. 2, 1999 (JP) .............................................. 11-218847

(51) Int. Cl.$^7$ ...................... G02F 1/1335; G02F 1/1333; B32B 17/06; G02B 5/08
(52) U.S. Cl. ........................ 349/113; 349/122; 428/434; 359/883; 359/884
(58) Field of Search ................................. 349/113, 122; 359/883, 884; 428/434, 469, 922, 626, 630

(56) References Cited

U.S. PATENT DOCUMENTS

| 4,495,254 A | * | 1/1985 | Hoffman ..................... 428/632 |
|---|---|---|---|
| 4,944,581 A | * | 7/1990 | Ichikawa ..................... 350/641 |
| 5,446,339 A |   | 8/1995 | Kinoshita et al. ........... 313/478 |
| 5,516,456 A | * | 5/1996 | Shinohara et al. ..... 252/299.01 |
| 5,681,885 A |   | 10/1997 | Kinoshita et al. ........... 524/430 |
| 5,874,801 A | * | 2/1999 | Kobayashi et al. ......... 313/478 |
| 5,879,217 A | * | 3/1999 | Saito et al. ..................... 445/23 |
| 5,962,966 A |   | 10/1999 | Chigusa et al. ............. 313/479 |
| 6,143,418 A | * | 11/2000 | Takamiya et al. ........... 428/434 |
| 6,146,753 A | * | 11/2000 | Niimi et al. ................. 428/332 |
| 6,187,445 B1 | * | 2/2001 | Ito et al. ..................... 428/426 |

FOREIGN PATENT DOCUMENTS

| JP | 09-08.205 A | * | 3/1997 |
| JP | 11-326602 A | * | 11/1999 |

* cited by examiner

Primary Examiner—William L. Sikes
Assistant Examiner—Tarifur R. Chowdhury
(74) Attorney, Agent, or Firm—Burns, Doane, Swecker & Mathis, LLP

(57) ABSTRACT

A low-reflection transparent conductive multi layer film to be attached to the front panel of cathode-ray tubes or plasma displays comprising, in the order described, a transparent substrate, a hard coat layer, a transparent conductive layer containing particles comprising at least one of a metal and a metal oxide, and at least one transparent protective layer which has anti-smudge properties, has a refractive index different from that of the transparent conductive layer and comprises a resin having a high dielectric power factor.

16 Claims, 1 Drawing Sheet

LOW-REFLECTION TRANSPARENT CONDUCTIVE MULTI LAYER FILM HAVING AT LEAST ONE TRANSPARENT PROTECTIVE LAYER HAVING ANTI-SMUDGE PROPERTIES

FIELD OF THE INVENTION

This invention relates to a transparent conductive multi layer film excellent in antistatic effect, electromagnetic wave shielding, antireflection, mechanical strength and anti-smudge. More particularly it relates to a transparent conductive film useful for antireflection of the face panel (i.e., the front panel) of cathode-ray tubes, plasma displays, etc.

BACKGROUND OF THE INVENTION

A transparent antistatic and electromagnetic wave shielding material has been demanded for various electronic equipment. For example, a cathode-ray tube or a plasma display used in TV sets or computer displays easily attracts dust by static electrification of the front panel to reduce visibility or radiates electromagnetic waves to give adverse influences to the surroundings. An antireflection function has also become necessary to cope with the tendency of the cathode-ray tube flattening. Additionally the front panel is liable to receive scratches by the touch with fingers or on cleaning.

For the purpose of statiec prevention, electromagnetic wave shielding and antireflection, it has been proposed to form a conductive layer comprising a metal such as silver or a conductive metal oxide such as indium-tin oxide (ITO) directly on the front panel by vapor deposition or sputtering technique. However, such vapor deposition and sputtering techniques involve a vacuum treatment or a high temperature treatment, which increases the production cost, or have poor productivity.

Thin conductive film formation techniques based on a sol-gel process have also been proposed [see Habu et al., *National Technical Report*, Vol. 40, No. 1, p. 90 (1994) and Y. Ono et al., SID 92DIGEST, 511 (1992)]. However, these techniques also require a high temperature treatment. Besides, film formation on a transparent substrate, i.e., a plastic film or a hard coat, tends to induce denaturation of the substrate, which has limited the choice of the substrate material.

Transparent conductive coatings having dispersed therein conductive oxide particles or colloidal particles have also been proposed [see JP-A-6-344489 and JP-A-7-268251 (The term "JP-A" as used herein means an "unexamined published Japanese patent application") and H. Murakami et al., SID 89 DIGEST, 270 and SID 93 DIGEST, 209, (1998)]; but the resulting transparent conductive layer has insufficient conductivity.

In order to improve conductivity of the conductive films, JP-A-9-55175 proposes a transparent conductive film obtained by applying a coating composition comprising metal particles. JP-A-10-142401 discloses a low-reflection transparent conductive film obtained by applying an antireflective coating composition comprising tetraethoxysilane, etc. on a transparent conductive film. However, the film formed by merely coating a transparent substrate with metal particles has insufficient mechanical strength, and the antireflective coating such as tetraethoxysilane should be treated in high temperature for a long time. Since formation of an antireflective layer by a sol-gel process limits the material of the transparent substrate, the above-mentioned low-reflection transparent conductive film cannot be carried out except by directly applying the coating composition to the glass face panel.

Instead of the method comprising direct application of a coating composition to a face panel which entails high initial cost and requires a high temperature treatment, methods of attaching a thin film formed on a separate substrate to the face panel have been developed (see Taki et al., *National Technical Report*, Vol. 42, No. 3, pp. 264–268 (1996)). These methods rely on thin film deposition techniques in a vacuum system, such as vacuum evaporation, sputtering and the like for forming a conductive metal oxide film (e.g., ITO), which are very costly and less productive as previously mentioned.

On the other hand, it is necessary to ground a conductive layer for electromagnetic wave shielding as described in JP-A-10-3868. Where the conductive layer has a protective layer, it is difficult to lead a grounding wire from the protective layer. In order to be grounded, the conductive layer should be provided with some grounding terminals or be partially exposed by some means. For example, grounding of the conductive layer has been carried out by adhering a conductive tape to the conductive layer before formation of a low-refractive layer thereon, or partly peeling the surface protective layer, or piercing the protective layer, or ultrasonic welding. Such a processing step for grounding is very likely to be accompanied by damages such as scratches to the conductive layer, the protective layer or any other functional layers, resulting in deterioration of weather resistance and impairment of the commercial value. These extra steps also contribute to an increase of cost and a reduction of productivity.

SUMMARY OF THE INVENTION

An object of the present invention is to provide a low-reflection conductive multi layer film which is excellent in productivity as well as antistatic properties, electromagnetic wave shielding performance, reflection preventive properties, mechanical characteristics and anti-smudge properties and which can be stuck to a face panel (i.e., a front panel).

Another object of the invention is to provide a transparent conductive film which is excellent in productivity in directly grounding the surface of the conductive film.

The above objects are accomplished by a low-reflection transparent conductive multi layer film comprising, in the order described, a transparent substrate, a hard coat, a transparent conductive layer containing particles comprising at least one of a metal and a metal oxide, and at least one transparent protective layer for the conductive layer which has anti-smudge properties and has a refractive index different from that of the transparent conductive layer.

The low-reflection transparent conductive film of the invention is directly attached to a cathode-ray tube or a plasma display panel used in a TV set or a computer display to perform the desired functions with greatly simplified equipment through greatly simplified steps as compared with the conventional vapor deposition techniques such as PVD or CVD or the conventional method comprising applying a conductive coating directly to the face panel. The invention also allows the surface of the protective layer to be grounded directly, which leads to simplification of the production steps.

DETAILED DESCRIPTION OF THE INVENTION

Figure 1:
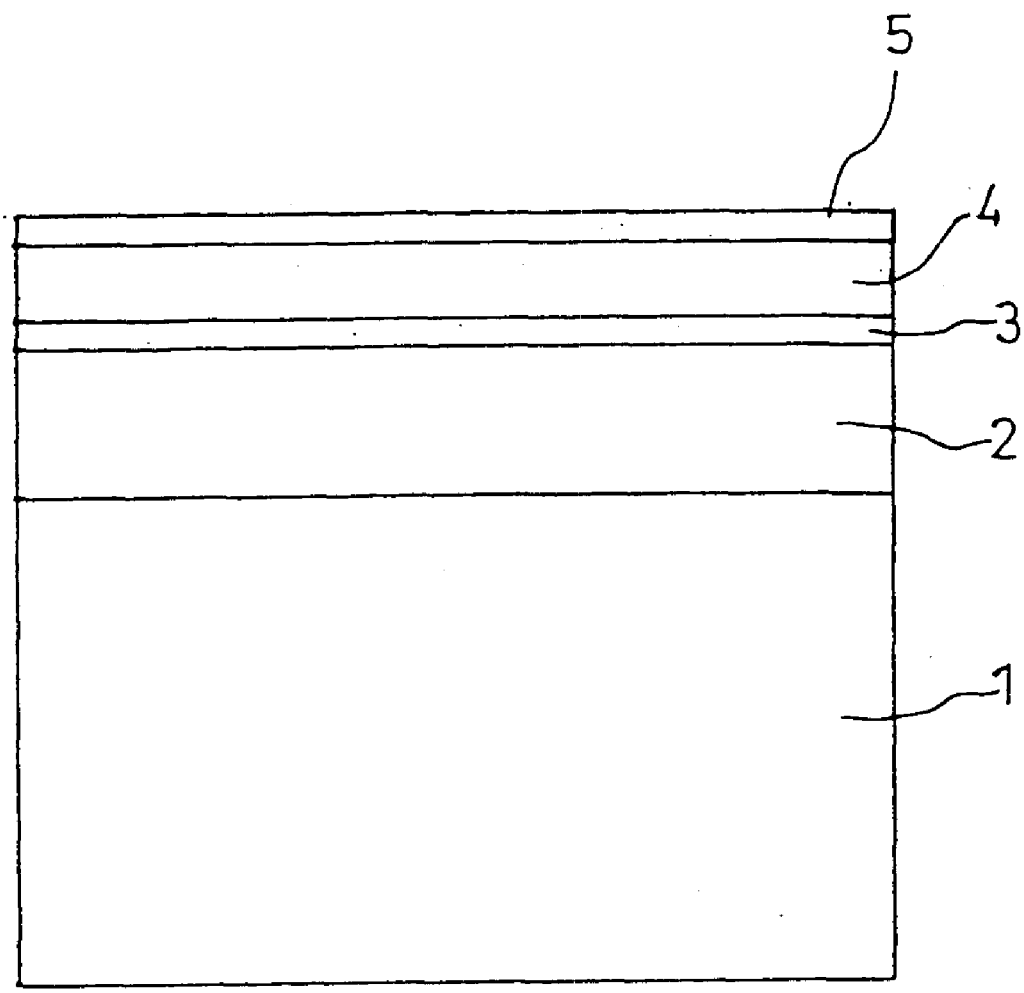
FIG. 1 is a schematic view illustrating the structure of the low-reflection transparent conductive multi layer film of the invention.

In FIG. 1 is shown a preferred example of the low-reflection transparent conductive multi layer film (hereinafter sometimes simply referred to as a multi layer film) of the invention, in which the multi layer film is composed of, in the order described, a substrate 1, a hard coat layer 2, a transparent conductive layer 3 containing conductive particles, and a protective layer 4 for the conductive layer 3 (hereinafter simply referred to as a protective layer), and an anti-smudge layer 5 as a top layer (i.e., an outermost layer). The protective layer 4 may combine the function for anti-smudge, in which case the anti-smudge layer 5 may be omitted.

Having the hard coat, the multi layer film of the invention is protected from scratches. Having the transparent conductive layer containing conductive metal or metal oxide particles, the multi layer film is antistatic and effectively shields electromagnetic waves radiated from cathode-ray tubes, etc. Having the protective layer whose refractive index is different from that of the transparent conductive layer, the multi layer film reduces reflection of incident light. Where the protective layer comprises a resin having a dielectric power factor of 0.01 or higher (at 50 Hz), it is possible to lead a ground wire directly from the protective layer. Further, the multi layer film is protected against smudge by the protective layer having anti-smudge properties or the separately provided anti-smudge top layer.

The substrate which can be used in the invention is a resin film. Suitable resins include polyesters, such as polyethylene terephthalate, polyethylene naphthalate, and polyethylene terephthalate/polyethylene naphthalate copolymers or mixtures; polycarbonate resins; norbornene resins (cyclic olefin copolymers); celluloses or cellulose esters, such as cellulose triacetate and cellulose diacetate; polyarylate resins; polyacrylates, such as polymethylacrylate; and polymethyl methacrylate. The substrate preferably has a thickness of 20 to 500 $\mu$m, particularly 100 to 200 $\mu$m. Too thin substrate is mechanically weak, and too thick substrate is so stiff and is difficult to apply.

The above-described resins, being hydrophobic, are desirably subjected to an appropriate surface activation treatment for making the surface adhesive to the layer formed thereon, such as a chemical treatment, a mechanical treatment, a corona discharge treatment, a flame treatment, an ultraviolet (UV) treatment, a radiofrequency treatment, a glow discharge treatment, an active plasma treatment, a laser treatment, a mixed acid treatment, an ozone oxidation treatment, and the like. It is also a preferred manipulation that a primer coat is provided on the surface-treated substrate or directly on the untreated substrate. The primer coat can be a single layer of a resin containing both a hydrophobic group and a hydrophilic group or a double layer composed of a first layer showing good adhesion to the substrate, which is formed in contact with the substrate, and a second layer showing good adhesion to the constituent layer provided thereon.

Of the above-described surface treatments, preferred are a UV treatment, a flame treatment, a corona discharge treatment, and a glow discharge treatment. The UV treatment is preferably carried out in accordance with the procedures taught in JP-B-43-2603, JP-B-43-2604, and JP-B-45-3828 [The term "JP-B" as used herein means an "examined Japanese patent publication]. A high-pressure mercury lamp emitting UV rays having wavelengths of 180 to 320 nm is used preferably. The corona discharge treatment can be conducted in a conventional manner. For example, the methods disclosed in JP-B-48-5043, JP-B-47-51905, JP-A-47-28067, JP-B-49-83767, JP-A-51-41770, and JP-A-51-131576 can be used. A suitable discharge frequency is from 50 Hz to 5000 kHz, preferably 5 kHz to several hundreds of kilohertz, still preferably 10 to 30 kHz. The flame treatment can be effected with natural gas, liquefied petroleum gas (LPG), etc. A gas/air ratio is of importance. A preferred LPG/air ratio is 1/14 to 1/22, particularly 1/16 to 1/19, by volume, and a preferred natural gas/air ratio is 1/6 to 1/10, particularly 1/7 to 1/9, by volume. The flame energy to be applied is preferably 1 to 50 kcal/m$^2$, particularly 3 to 20 kcal/m$^2$. The glow discharge treatment, which is particularly effective, is performed by any techniques known conventionally. Reference can be made, e.g., in JP-B-35-7578, JP-B-36-10336, JP-B-45-220004, JP-B-45-22005, JP-B-45-24040, JP-B-46-43480, U.S. Pat. Nos. 3,057,792, 3,057,795, 3,179,482, 3,288,638, 3,309,299, 3,424,735, 3,462,335, 3,475,307, and 3,761,299, British Patent 997,093, and JP-A-53-129262.

The primer which can be applied to the substrate includes various kinds of polymers, such as those comprising monomers selected from vinyl chloride, vinylidene chloride, styrene, butadiene, methacrylic acid (or esters), acrylic acid (or esters), itaconic acid (or esters), maleic anhydride, and so forth; polyethyleneimine, epoxy resins, grafted gelatin, and nitrocellulose.

Hydrophilic polymers are also applicable as a primer, such as water-soluble polymers, cellulose esters, latex polymers, and water-soluble polyesters. Examples of the water-soluble polymers include gelatin, gelatin derivatives, casein, agar, sodium alginate, starch, polyvinyl alcohol, polyacrylic acid copolymers, and maleic anhydride copolymers. Examples of the cellulose esters include carboxymethyl cellulose and hydroxyethyl cellulose. Examples of the latex polymers include vinyl chloride copolymers, vinylidene chloride copolymers, acrylic ester copolymers, vinyl acetate copolymers, and butadiene copolymers. The primer composition can contain a curing agent, such as chromium salts (e.g., chromium alum), aldehydes (e.g., formaldehyde or glutaraldehyde), isocyanate compounds, active halogen compounds (e.g., 2,4-dichloro-6-hydroxy-s-triazine), and epichlorohydrin resins. The primer composition is applied by well-known techniques, such as dip coating, air knife coating, curtain coating, roller coating, wire bar coating, gravure coating, and the like. The extrusion coating using a hopper described in U.S. Pat. No. 2,681,294 is effective as well.

The hard coat layer which may be used in the present invention can be of any known curing resins, including thermosetting resins and active energy ray-curing resins. Examples of the thermosetting resins include those curable on crosslinking of prepolymers, such as melamine resins, urethane resins, andepoxyresins. Examples of the active energy ray-curing resins include polyfunctional curing monomers, such as polyfunctional (meth)acrylates, e.g., pentaerythritol tetra(meth)acrylate, dipentaerythritol hexa (meth)acrylate, and trimethylolpropane tri(meth)acrylate. Examples of the active energy rays include UV rays, electron beams, and γ-rays, with UV rays being preferred. In the case of UV curing, a polymerization initiator is preferably added, if necessary, to the curing monomers. Preferred active energy-curing resins are active energy ray-curing compounds such as pentaerythritol tetra(meth)acrylate and dipentaerythritol hexa(meth)acrylate.

The hard coat layer can contain, as a filler, fine particles or colloidal particles of metal oxides such as silica, alumina, zirconia or titania to have increased hardness. Harder particles produce better results. Particles having a Mohs' hardness of 6 or more are preferred. The particles preferably have a particle size of 1 to 100 nm. Particles greater than 100 nm tend to cause haze, and particles finer than 1 nm are difficult to disperse, failing to produce the effects as a filler. The particles are preferably added in an amount of 5 to 50% by volume, particularly 20 to 45% by volume, based on the curing resin. Addition of more than 50% makes the film brittle, and addition of less than 5% produces insubstantial effects. The metal oxide particles are preferably subjected to a surface modification treatment to improve dispersibility and compatibility with the resin. Suitable surface modification treatments include treatment with a silane coupling agent containing a (meth)acryl group or a (meth)acrylic acid derivative containing a polar group such as a carboxyl group or a phosphoric acid group, and the like.

The hard coat layer preferably has a thickness of 2 to 30 $\mu$m, still preferably 4 to 10 $\mu$m. If desired, the hard coat layer may contain an anionic surfactant or a cationic surfactant or may be subjected to a surface treatment such as a corona discharge treatment or a glow discharge treatment, to improve the surface hydrophilicity or adhesion.

The conductive layer according to the present invention is a layer containing at least one of a conductive metal and a conductive metal oxide. The conductive layer has a surface resistivity of 10 k$\Omega$/sq. (applied voltage: 90 V) or less, preferably 10 to 1000 $\Omega$/sq., still preferably 10 to 700 $\Omega$/sq. The conductive layer could be formed by carrying out vapor-deposition, sputtering or plating of a metal or a metal oxide. Also, it is preferably formed by coating with conductive particles of a metal or a metal oxide from the standpoint of productivity. Examples of the conductive metal particles include gold, silver, copper, aluminum, iron, nickel, palladium, platinum, and alloys thereof. Examples of the conductive metal oxide particles include indium oxide, tin oxide, antimony oxide, zinc oxide, aluminum oxide, silicon oxide, iron oxide, and composite oxides thereof. Metal particles are preferred as conductive particles. Silver particles or metal alloy particles mainly consisted of silver are more preferred, and silver particles are particularly preferred. From the standpoint of weatherability, a silver-palladium alloy is preferred. The palladium content of the alloy is preferably 5 to 30% by weight. Too small palladium content is ineffective on weatherability, and too high palladium content reduces conductivity.

Methods of forming the metal particles include the ordinary low-vacuum evaporation techniques and the method of preparing metal colloid comprising reducing an aqueous solution of a metal salt.

The metal or metal oxide particles preferably have an average particle size of 1 to 200 nm. Greater particles than 200 nm will absorb much light, resulting in a reduced light transmission and an increased haze of the conductive layer. Smaller particles than 1 nm are difficult to disperse. Moreover, the conductive layer will have a drastically increased surface resistivity, failing to provide a multi layer film having low resistance enough to achieve the object of the invention. To secure high conductivity, it is preferred for the transparent conductive layer to consist substantially solely of conductive particles, not containing non-conductive materials such as a binder resin.

The transparent conductive layer containing the metal or metal oxide particles is formed by coating the hard coat with a dispersion of the metal or metal oxide particles in a solvent mainly comprising water. Solvents that can be mixed into water preferably are alcohols, such as ethyl alcohol, n-propyl alcohol, isopropyl alcohol, 1-butyl alcohol, 2-butyl alcohol, t-butyl alcohol, methyl cellosolve, and butyl cellosolve.

The metal or metal oxide particles are preferably applied in an amount of 50 to 150 mg/m$^2$. Too small amount of the conductive particles fails to secure conductivity, and too large amount of the conductive particles deteriorates transparency.

The transparent conductive layer should have a surface resistivity of 1000 $\Omega$/sq. or smaller in order to fulfill TCO (Tianstemanners Central Organisation) Guidelines specified by Swedish Central Labor's Society. The transparency is preferably 50% or more in terms of light transmittance. As for transparency, the transparent conductive layer may be dark as far as a display panel to which the multi layer film is attached is practically visible but preferably has a visible light transmittance of 50% or higher, still preferably 55% or higher, particularly preferably 60% or higher.

The protective layer which can be used in the present invention is preferably formed of a resin having a dielectric power factor of 0.01 or more (at a frequency of 50 Hz). The "dielectric power factor" is one of the attributes of an electrical insulator. Resins having a higher dielectric power factor easily cause insulation destruction and thereby are preferred in the present invention. For the details of the "dielectric power factor", refer to *Kagaku Binran Kiso-hen* II, pp. 1177–1179, Maruzen (1975). Examples of the resins having a dielectric power factor of 0.01 or more for use in the invention preferably include, but are not limited thereto, polyisoprene (dielectric power factor (hereinafter the same): about. 0.03 or more), chlorosulfonated polyethylene (about 0.03 or more), polysulfide rubber (about 0.1), fluororubber (about 0.03), casein (about 0.06), phenolic resins (about 0.05 or more), polysulfide epoxy resins (0.01 or more), urea resins (about 0.03 or more), melamine resins (about 0.03), nylon 6 (0.01 or more), nylon 66 (0.01 or more), polymethyl methacrylate (about 0.05), ethyl acrylate-ethylene copolymers (0.01 or more), polyvinyl chloride (0.01 or more), polyvinylidene chloride (about 0.03 or more), polyvinylidene fluoride (about 0.05), cellulose mono-, di- or triacetate (about 0.02), and nitrocellulose (about 0.1).

Preferred among these resins are fluororubber, phenolic resins, urea resins, melamine resins, nylon 6, nylon 66, polymethyl methacrylate, polyvinyl chloride, polyvinylidene chloride, polyvinylidene fluoride, polyvinyl formal, cellulose mono-, di -or triacetate, and nitrocellulose. Active energy ray-cured (e.g., UV-, electron- or $\gamma$-ray-cured) resins are also preferred. Active energy ray-polymerized resins prepared from a polyfunctional vinyl derivative of a polyol (e.g., polyfunctional (meth)acrylic polyesters) are particularly preferred for their surface hardness and mechanical strength. Preferred examples of the polyfunctional vinyl derivatives include trimethylolpropane tri(meth)acrylate, pentaerythritol tetra(meth)acrylate, and dipentaerythritol hexa(meth)acrylate. If desired, a polymerization initiator can be added to the active energy ray-curing resin precursor.

The thickness of the protective layer is not limited as long as conductivity can be obtained from its surface but is preferably 10 to 2000 nm, still preferably 20 to 1000 nm, particularly preferably 20 to 500 nm, especially preferably 10 to 500 nm, the most preferably 30 to 300 nm. The surface resistivity of the protective layer is preferably 10 k$\Omega$/sq. or less, still preferably 5 k$\Omega$/sq. or less, particularly preferably 2 k$\Omega$/sq. or less, especially preferably 1 k$\Omega$/sq. or less (applied voltage: 90 V). The practical minimal surface resistivity is preferably 10 Ω/sq. Where the protective layer is 300 nm thick, a surface resistivity of 1 kΩ or less can be obtained at an applied voltage of 10 V. The ratio of the surface resistivity after formation of the protective layer (i.e., the surface resistivity of the protective layer) to that before formation of the protective layer (i.e., the surface resistivity of the transparent conductive layer) preferably falls within a range of from 0.5 to 1.5. By forming the protective layer, the metal, the metal particles, the metal oxide or the metal oxide particles of the conductive layer can be firmly fixed, and the surface resistivity is reduced. As a result, the change in resistivity before and after the formation of the protective layer is reduced. Essentially being insulating, the protective layer increases its resistivity as its thickness increases, and the ratio of the resistivity after the protective layer formation to that before the formation increases as a result. The protective layer can perform the function as an antireflective coat with its refractive index controlled as hereinafter described.

If desired, the protective layer can contain a metal oxide. Suitable examples of metal oxides include oxides of silica, alumina, zirconia, and titania. These oxides are added for the purpose of improving the film strength or varying the refractive index of the layer. It is also possible to further provide an overcoat layer on the protective layer. Preferred materials for the overcoat layer include well-known low-surface energy compounds containing fluorine, such as silicone compounds containing a fluorinated hydrocarbon group and polymers containing a fluorinated hydrocarbon group. These compounds may be provided not only in the overcoat layer but in the protective layer. Those compounds which are orientated in the vicinities of the layer surface after being added thereby serving for surface modification are preferred.

The at least one protective layer whose refractive index is different from that of the transparent conductive layer has a refractive index of 1.70 or smaller. The protective layer may have such a layer structure that the outermost layer thereof has an anti-smudge function. In this case, the protective layer preferably has a refractive index of 1.30 to 1.70, particularly 1.35 to 1.60. If the refractive index exceeds 1.70, the antireflective effect is small. If it is less than 1.30, the reflection on the interface with the transparent conductive layer becomes large.

Materials capable of forming a film having a refractive index between 1.30 and 1.70 include organic synthetic resins, such as polyester resins, acrylic resins, epoxy resins, melamine resins, polyurethane resins, polyvinyl butyral resins, and UV-curing resins (for more specific examples, refer to *Polymer Handbook*, 4th Ed., VI-571, John Wiley & Son, Inc. (1999)); hydrolysate of metal (e.g., silicon) alkoxides; and organic or inorganic compounds, such as silicone monomers or silicon oligomers. Preferred are active energy ray-curing resin (precursors), such as pentaerythritol tetra (meth)acrylate or dipentaerythritol hexa(meth)acrylate, which may contain fine particles of silica, alumina, etc. to brings about increased surface hardness.

For securing antireflection performance, the thickness of the protective layer is selected to produce effects on reflectance reduction, preferably from a range of from 50 to 150 nm. It is preferred that the product of the refractive index and the thickness (nm) of the protective layer falls within a range of from 100 to 200.

The protective layer can contain a fluorine- and/or silicon-containing compound to improve the anti-smudge properties. Such a compound preferably includes well-known fluorine compounds or silicon compounds, compounds having a block containing a fluorine- and silicon-containing moiety, and compounds comprising a segment compatible with a resin or a metal oxide, etc. and a segment containing fluorine or silicon. Addition of such a compound to the protective layer whose refractive index is different from that of the transparent conductive layer results in localization of fluorine or silicon in the vicinity of the surface of the protective layer.

Specific examples of the F- and/or Si-containing compounds include block or graft copolymers comprising an F- or Si-containing monomer unit and a hydrophilic or lipophilic monomer unit. Examples of the F-containing monomer includes perfluoroalkyl group-containing (meth)acrylic esters, such as hexafluoroisopropyl acrylate, heptadecafluorodecyl acrylate, perfluoroalkylsulfonamide ethylacrylate, and perfluoroalkylamide ethylacrylate. Examples of the Si-containing monomer includes the one having a siloxane group obtained by the reaction between polydimethylsiloxane and (meth)acrylic acid, etc. Examples of the hydrophilic or lipophilic monomer includes (meth)acrylic esters (e.g., methyl acrylate), esters between a polyester having a hydroxyl group at the terminal and (meth) acrylic acid, hydroxyethyl (meth) acrylate, and polyethylene glycol (meth)acrylate. These F- and/or Si-containing compounds are commercially available under trade names Defensa MCF-300, 312 and 323 (acrylic oligomers having a microdomain structure of a perfluoroalkyl chain), Megafac F-170, F-173 and F-175 (perfluoroalkyl group/lipophilic group-containing oligomers), Megafac F-171 (perfluoroalkyl group/hydrophilic group-containing oligomers) (all these products are available from Dai-Nippon Ink & Chemicals, Inc.); and Modiper F-200, 220, 600 and 820 (fluoroalkyl type block polymers of a vinyl monomer, comprising a segment showing excellent migration and a resin compatible segment) and Modiper FS-700 and 710 (silicon type) (Modiper series are available from Nippon Oil & Fats Co., Ltd.).

The F- and/or Si-containing compound can be added in such an amount that the compound may localize to the surface of the protective layer to increase the contact angle to 90° or greater, preferably 100° or greater. More specifically the compound is added in an amount of 1 to 50%, preferably 5 to 30%, by weight based on the protective layer. When the amount is too small, the anti-smudge effect is small. When the amount exceeds 50% by weight, the film strength, particularly scratch resistance, is reduced.

Where an anti-smudge layer is provided as an outermost layer, compounds which can be used in the outermost layer preferably have a refractive index of 1.30 to 1.50. Such compounds preferably include F-containing compounds having low surface energy, such as silicone compounds containing a fluorinated hydrocarbon group and polymers containing a fluorinated hydrocarbon group described in JP-A-57-34526, JP-A-2-19801, and JP-A-3-17901.

The multi layer film of the present invention can be prepared by successively applying the respective coating compositions to a transparent substrate film by various known thin film coating techniques, such as dip coating, spin coating, spraying, roll coating, blade coating, and wire bar coating, each followed by drying. Wire bar coating is preferred.

As described above, the multi layer film of the present invention has an antireflection function as well as excellent mechanical characteristics, antistatic properties and electromagnetic wave shielding properties. Further, the multi layer film has a low surface resistivity, and the protective layer has a great dielectric power factor so that a ground can be led directly from the protective layer. Therefore, the present invention provides a low-reflection transparent conductive multi layer film having an electromagnetic wave shielding function, an antireflection function, and an anti-smudge function which can be attached to the front surface of cathode-ray tubes or plasma displays and can be grounded by a simple method.

Embodiments of the present invention are summarized below.

(1) A low-reflection transparent conductive multi layer film comprising, in the order described, a transparent substrate, a hard coat layer, a transparent conductive layer which comprises conductive particles comprising at least one metal, and at least one transparent protective layer for the conductive layer having anti-smudge properties and a refractive index different from that of the transparent conductive layer.

(2) A transparent conductive multi layer film comprising a transparent substrate, at least one conductive layer, and a protective layer comprising a resin having a dielectric power factor of 0.01 or more at 50 Hz.

(3) A low-reflection transparent conductive multi layer film comprising, in the order described, a transparent substrate, a hard coat layer, at least one transparent conductive layer which comprises conductive particles comprising at least one of a metal and a metal oxide, and a transparent protective layer for the conductive layer, wherein the protective layer comprises at least one layer having anti-smudge properties and a refractive index different from that of the transparent conductive layer, and the protective layer contains a resin having a dielectric power factor of 0.01 or more at 50 Hz.

(4) The low-reflection transparent conductive multi layer film described in (3) above, wherein the transparent conductive layer has a surface resistivity of 10 kΩ/sq. or less at an applied voltage of 90 V.

(5) The low-reflection transparent conductive multi layer film described in (3) or (4) above, wherein the conductive particles have a particle size of 1 to 200 nm.

(6) The low-reflection transparent conductive multi layer film described in any one of (3) to (5) above, wherein the conductive particles are metal or metal oxide particles mainly comprising gold, silver or copper.

(7) The low-reflection transparent conductive multi layer film described in any one of (3) to (6), wherein said particles comprising a metal are particles comprising silver or a metal alloy mainly consisted of silver.

(8) The low-reflection transparent conductive multi layer film described in any one of (3) to (7), wherein the protective layer having anti-smudge properties has a refractive index of 1.30 to 1.70.

(9) The low-reflection transparent conductive multi layer film described in any one of (3) to (8), wherein said protective layer has a thickness of 10 to 500 nm.

(10) The low-reflection transparent conductive multi layer film described in any one of (3) to (9), wherein the protective layer has at least one antireflective layer and an outermost layer having anti-smudge properties.

(11) The low-reflection transparent conductive multi layer film described in any one of (3) to (10) above, wherein the outermost layer having anti-smudge properties contains a fluorine-containing compound.

(12) The low-reflection transparent conductive multi layer film described in any one of (3) to (11), wherein the protective layer has a surface resistivity of 2 kΩ/sq. or less at an applied voltage of 90 V.

(13) The low-reflection transparent conductive multi layer film described in (2) above, wherein the transparent substrate is a plastic film having a hard coat layer.

(14) A method for electrically grounding a low-reflection transparent conductive multi layer film comprising directly grounding the surface of a protective layer in the conductive multi layer film described in any one of (3) to (13).

EXAMPLE

The present invention will now be illustrated in greater detail with reference to Examples, but it should be understood that the invention is not deemed to be limited thereto. Unless otherwise noted, all the percents are by weight. Coating compositions used in Examples were prepared as follows.

1) Coating Composition for Hard Coat Layer

In a 500 ml glass-made three-necked flask equipped with a stirrer, a thermometer and a reflux condenser was put 200 g of a 40% methanol dispersion of silica particles having an average particle size of 15 nm, and 0.2 g of 2N hydrochloric acid was added thereto. The temperature was raised to 60° C. in a nitrogen stream, and 10 g of 3-methacryloyloxypropyltrimethoxysilane was put into the flask. The mixture was stirred for 4 hours to carry out surface treatment of the silica particles.

To 116 g of a 43% methanol dispersion of the surface-treated silica particles were added 97 g of methanol, 163 g of isopropyl alcohol, and 163 g of butyl acetate. To the mixture was added 200 g of a mixture of dipentaerythritol pentaacrylate and dipentaerythritol hexaacrylate (DPHA, available from Nippon Kayaku Co., Ltd.) and dissolved. In the resulting solution was dissolved 7.5 g of a photopolymerization initiator (Irgacure 184, available of Chiba Geigy, Ltd.). After stirring for 30 minutes, the mixture was filtered through a polypropylene filter having a pore size of 1 μm to prepare a coating composition for a hard coat layer (designated coating composition 1).

2) Coating Composition for Conductive Layer (Colloidal Silver Dispersion)

30 wt % (i.e., 30 mass %) Iron (II) sulfate heptahydrate ($FeSO_4 \cdot 7H_2O$) and 40 wt % citric acid were prepared and mixed. A solution of 10 wt % silver nitrate and palladium nitrate (molar ratio: 9/1) was added thereto at a rate of 200 ml/min while keeping the mixture at 20° C. under stirring. The precipitate thus formed was collected by centrifugal separation followed by washing. Centrifugation and washing were repeated, and finally pure water was added to prepare a 3% aqueous dispersion of colloidal silver/palladium. The colloidal particles were found to have a particle size of about 9 to 12 nm under a transmission electron microscope. ICP (inductively coupled plasma) analysis on the dispersion revealed that the silver to palladium molar ratio was 9/1, the same as the charged silver to palladium ratio.

Isopropyl alcohol was added to 100 g of the resulting colloidal silver dispersion, followed by ultrasonic dispersing. The dispersion was filtered through a polypropylene filter having a pore size of 1 μm to prepare a coating composition (designated coating composition 2).

3) Coating Composition for Protective Layer

Two grams of a mixture of dipentaerythritol pentaacrylate and dipentaerythritol hexaacrylate (DPHA, available from Nippon Kayaku Co., Ltd.), 80 mg of a photopolymerization initiator (Irgacure 907, available from Chiba Geigy, Ltd.), and 30 mg of a photosensitizer (Kayacure ETX, available from Nippon Kayaku Co., Ltd.) were dissolved in a 2:2:1 (by mass (weight)) mixed solvent of methyl isobutyl ketone, 2-butanol and methanol. The concentration was adjusted to give a prescribed coating thickness. The mixture was stirred for 30 minutes and filtered through a polypropylene filter having a pore size of 1 μm to prepare a coating composition for a protective layer (designated coating composition 3).

4) Coating Composition for Anti-smudge Layer

Isopropyl alcohol was added to a heat-crosslinkable fluoropolymer (JN-7214, available from JSR K.K.) to prepare a 0.06% coarse dispersion, which was further dispersed ultrasonically to prepare a coating composition for an anti-smudge layer (designated coating composition 4).

5) Coating Composition for Protective Layer Having Anti-smudge Properties

A 10% methyl isobutyl ketone solution of a reactive fluoropolymer (JN-7219, available from JSR K.K.; refractive index: 1.40) was diluted with an equal weight mixture of t-butyl alcohol and methyl isobutyl ketone to prepare a 2% solution (designated coating composition 5a).

Coating composition 5b was prepared in the same manner as for coating composition 3, except for further containing 0.4 g of a perfluoroalkyl-containing acrylic ester (Megafac F-531A, available from Dai-Nippon Ink & Chemicals, Inc.).

Example 1

Coating composition 1 (for a hard coat) was applied to a 175 μm thick polyethylene terephthalate film with a wire bar to obtain a dry thickness of 8 μm, dried and irradiated with UV light to form a hard coat layer, which was then subjected to a corona discharge treatment. Coating composition 2 (for conductive layer) was then applied thereon with a wire bar to a coating weight of 70 mg/m² and dried at 40° C. The conductive layer thus formed was sprayed with pure water fed by means of a pump, and excess water was removed with an air-knife and dried at 120° C. for 5 minutes. Coating composition 3 (for a protective layer) was then applied to a dry thickness of 90 nm, dried, and irradiated with UV light. Finally, coating composition 4 (for an anti-smudge layer) was applied with a #3 wire bar and dried and heat-treated at 120° C. to prepare a multi layer film. The protective layer had a refractive index of 1.52. The anti-smudge layer had a thickness of 3 nm and a refractive index of 1.425.

Comparative Examples 1 To 3

A multi layer film was prepared in the same manner as in Example 1, except that the hard coat layer was not provided (Comparative Example 1), the protective layer was not formed (Comparative Example 2), or the anti-smudge layer was not formed (Comparative Example 3).

The characteristics of the multi layer films prepared in Example 1 and Comparative Examples 1 to 3 were measured in accordance with the following methods. The results obtained are shown in Table 1 below.

1) Surface Resistivity

Measured with a 4-pin probe resistivity meter (LORESTA FP, manufactured by Mitsubishi Chemical Corp.). Prior to the measurement, the multi layer film was conditioned at 25° C., 60% RH for 2 hours.

2) Transmittance

Measured with a spectrophotometer TV-2400PC manufactured by Shimadzu Corp. An average transmittance over a wavelength range of 400 to 800 nm was obtained.

3) Average Reflectance

Measured with a spectrophotometer supplied by Nippon Bunko K.K. An average reflectance in regular reflection at an incident angle of 5° over a wavelength range of 450 to 650 nm was obtained.

4) Pencil Hardness

Measured by use of testing pencils specified in JIS S-6006 in accordance with the pencil hardness test method specified in JIS K-5400. Prior to the test, the multi layer film was conditioned at 25° C., 60% RH for 2 hours.

5) Anti-smudge Properties

Fingerprints left on the multi layer film were wiped off with "Traysee" (available from Toray Industries, Inc.). The anti-smudge properties were rated "good" (the fingerprints were completely wiped off) or "poor" (part of the fingerprints remained).

TABLE 1

| | Surface Resistivity (Ω/sq.) | Transmittance (%) | Average Reflectance (%) | Pencil Hardness | Anti-smudge Properties |
|---|---|---|---|---|---|
| Example 1 | 320 | 62 | 0.8 | 3 H | Good |
| Compara. Example 1 | 320 | 64 | 0.8 | HB | Good |
| Compara. Example 2 | 300 | 58 | 11.0 | 2 H | Good |
| Compara. Example 3 | 300 | 62 | 0.9 | 3 H | Poor |

Example 2

A multi layer film was prepared in the same manner as in Example 1, except that coating with coating composition 3 (for a protective layer) and coating composition 4 (for an anti-smudge layer) were replaced with coating with coating composition 5a (for a protective layer having anti-smudge properties). Coating composition 5a was applied with a wire bar to obtain a dry thickness of 96 nm and dried and heat-treated to cure at 120° C.

Example 3

A multi layer film was prepared in the same manner as in Example 1, except that coating with coating composition 3 (for a protective layer) and coating composition 4 (for an anti-smudge layer) were replaced with coating with coating composition 5b (for a protective layer having anti-smudge properties). The coating composition 5b applied was irradiated with UV rays to cure.

Comparative Examples 4 And 5

A multi layer film was prepared in the same manner as in Example 2, except that the hard coat layer was not provided (Comparative Example 4), or the protective layer was not formed (Comparative Example 5).

The multi layer films of Examples 2 and 3 and Comparative Examples 4 and 5 were evaluated in the same manner as in Example 1. The results obtained are shown in Table 2 below.

TABLE 2

|  | Surface Resistivity (Ω/sq.) | Transmittance (%) | Average Reflectance (%) | Pencil Hardness | Anti-smudge Properties |
|---|---|---|---|---|---|
| Example 2 | 330 | 60 | 0.75 | 3 H | Good |
| Example 3 | 330 | 60 | 0.85 | 3 H | Good |
| Compara. Example 4 | 340 | 62 | 0.85 | HB | Good |
| Compara. Example 5 | instable | 56 | 11.0 | 2 H | Poor |

Examples 4 To 11 And Comparative Examples 6 And 7

Multi layer films were prepared in the same manner as in Example 1, except for varying the thickness of the protective layer formed of coating composition 3 as shown in Table 3 below or replacing the coating composition 3 with a coating composition comprising the resin shown in Table 3. The resulting multi layer films were evaluated in the same manner as in Example 1 and, in addition, as for scratch resistance as described below. The results obtained are shown in Table 3.

6) Scratch Resistance

The film surface was subjected to rubbing at 60 double strokes with #0000 steel wool under a load of 200 g/cm$^2$. The scratch resistance of the film was evaluated as follows.

A . . . No scratches observed
B . . . Slight scratches observed
C . . . Scratches observed
D . . . Considerable scratches observed.

TABLE 3

|  | Protective Layer | | Surface Resistivity (Ω/sq.) | Transmittance (%) | Average Reflectance (%) | Pencil Hardness | Scratch Resistance |
|---|---|---|---|---|---|---|---|
|  | Coating Composition | Thickness (nm) |  |  |  |  |  |
| Compara. Example 2 | 3 | 0 | 300 | 58 | 11.0 | 2H | D |
| Example 4 | 3 | 50 | 320 | 62 | 2.8 | 3H | B |
| Example 1 | 3 | 90 | 320 | 62 | 0.8 | 3H | A |
| Example 5 | 3 | 120 | 330 | 62 | 1.8 | 3H | A |
| Example 6 | 3 | 200 | 450 | 64 | 3.5 | 3H | B |
| Example 7 | 3 | 300 | 600 | 65 | 6.0 | 3H | A |
| Example 8 | A | 90 | 280 | 60 | 0.9 | 3H | B |
| Example 9 | A | 120 | 300 | 63 | 1.4 | 3H | B |
| Example 10 | B | 100 | 310 | 64 | 1.0 | 2H | C |
| Example 11 | C | 100 | 330 | 62 | 0.9 | 2H | C |
| Compara. Example 6 | D | 50 | 100 k or more | 61 | 1.3 | 3H | C |
| Compara. Example 7 | D | 100 | 100 k or more | 61 | 1.0 | 3H | C |
| Compara. Example 8 | E | 100 | 80 k | 60 | 1.3 | 3H | B |

Note:

Resin A: Polymethyl methacrylate (dielectric power factor: about 0.05)

Resin B: Cellulose acetate (dielectric power factor: about 0.02)

Resin C: Nitrocellulose (dielectric power factor: about 0.1)

Resin D: Polystyrene (dielectric power factor: about 0.0001)

Resin E: Phenoxy resin (dielectric power factor: about 0.001)

Further, a 10 cm by 10 cm piece was cut out of the multi layer film of Example 1. Two pieces of copper foil were attached to the film on the diagonal with a conductive adhesive tape. The resistivity between the copper foil pieces was 900 Ω as measured with a tester, proving that excellent conductivity could be obtained from the protective layer. The film of Comparative Example 7 showed a resistivity of 10 MΩ or higher in the same test.

While the invention has been described in detail and with reference to specific examples thereof, it will be apparent to one skilled in the art that various changes and modifications can be made therein without departing from the spirit and scope thereof.

What is claimed is:

1. A low-reflection transparent conductive multi layer film comprising: a transparent substrate; a hard coat layer formed on said substrate; at least one transparent conductive layer which comprises conductive particles comprising at least one of a metal and a metal oxide, formed on said hard coat layer; and a transparent protective layer for the conductive layer, formed on said conductive layer, wherein said protective layer comprises at least one layer having anti-smudge properties and a refractive index different from that of said transparent conductive layer, wherein each layer of said protective layer contains an active energy ray-cured resin having a dielectric power factor of 0.01 or more at 50 Hz and the product of the refractive index and the thickness of the protective layer is from 100 to 200.

2. The low-reflection transparent conductive multi layer film as in claim 1, wherein said transparent conductive layer has a surface resistivity of 10 kΩ/sq. or less at an applied voltage of 90 V.

3. The low-reflection transparent conductive multi layer film as in claim 1, wherein said conductive particles in said transparent conductive layer have a particle size of 1 to 200 nm.

4. The low-reflection transparent conductive multi layer film as in claim 1, wherein said conductive particles in said transparent conductive layer are metal or metal oxide particles mainly comprising gold, silver or copper.

5. The low-reflection transparent conductive multi layer film as in claim 1, wherein said metal particles are particles comprising silver or a metal alloy mainly consisted of silver.

6. The low-reflection transparent conductive multi layer film as in claim 1, wherein said protective layer having anti-smudge properties h as a refractive index of 1.30 to 1.70.

7. The low-reflection transparent conductive multi layer film as in claim 1, wherein said protective layer has a thickness of 10 to 500 nm.

8. The low-reflection transparent conductive multi layer film as in claim 1, wherein said protective layer has at least one antireflective layer and an outermost layer having anti-smudge properties.

9. The low-reflection transparent conductive multi layer film as in claim 8, wherein said outermost layer having anti-smudge properties contains a fluorine-containing compound.

10. The low-reflection transparent conductive multi layer film as in claim 1, wherein said protective layer has a surface resistivity of 2 k$\Omega$/sq. or less at an applied voltage of 90 V.

11. The low-reflection transparent conductive multi layer film as in claim 1, wherein the protective layer is a single layer having an anti-smudge property and a refractive index which is different from that of the transparent conductive layer.

12. The low-reflection transparent conductive multi layer film as in claim 1, wherein the resin contained in the protective layer is an active energy ray-polymerized resin prepared from a polyfunctional vinyl derivative of a polypol.

13. The low-reflection transparent conductive multi layer film as in claim 12, wherein the active energy ray-cured resin is trimethylol propane tri(meth) acrylate, pentaerythritol tetra(meth)acrylate or dipentaerythritol hexa(meth)acrylate.

14. The low-reflection transparent conductive multi layer film as in claim 1, wherein the protective layer for the conductive layer has a refractive index of from 1.30 to 1.70.

15. The low-reflection transparent conductive multi layer film as in claim 1, wherein the protective layer for the conductive layer has a refractive index of from 1.35 to 1.60.

16. A method for electrically grounding a low-reflection transparent conductive multi layer film comprising leading a ground directly from the surface of a protective layer in the conductive multi layer film, wherein the conductive multi layer film comprises: a transparent substrate; a hard coat layer formed on said substrate; at least one transparent conductive layer which comprises conductive particles comprising at least one of a metal and a metal oxide, formed on said hard coat; and a transparent protective layer for the conductive layer, formed on said conductive layer, wherein said protective layer comprises at least one layer having anti-smudge properties and a refractive index different from that of said transparent conductive layer, wherein each layer of said protective layer contains an active energy ray-cured resin having a dielectric power factor of 0.01 or more at 50 Hz and the product of the refractive index and the thickness of the protective layer is from 100 to 200.

\* \* \* \* \*